United States Patent [19]
Martin et al.

[11] Patent Number: 5,217,174
[45] Date of Patent: Jun. 8, 1993

[54] BALE BREAKER

[75] Inventors: Norman W. Martin, Stowe; Fritz Van Lingen, Malboro, both of Mass.; Stephen A. Zayachek, Cohoes; John J. Lasky, Jr., Schenectady, both of N.Y.

[73] Assignee: WTE Corporation, Bedford, Mass.

[21] Appl. No.: 782,530

[22] Filed: Oct. 25, 1991

[51] Int. Cl.⁵ .............................................. B02C 1/08
[52] U.S. Cl. .................................... 241/222; 241/277; 241/605
[58] Field of Search .............. 241/30, 222, 277, 282.1, 241/282.2, 605, 152.1, 223

[56] References Cited

U.S. PATENT DOCUMENTS

| | | | |
|---|---|---|---|
| 2,561,069 | 7/1951 | Peterson | 241/223 X |
| 3,897,018 | 7/1975 | Wilkes et al. | 241/223 |
| 5,017,399 | 5/1991 | Montamo et al. | 241/605 X |

OTHER PUBLICATIONS

Product literature for Rader Chip Preparation System, Rader Companies, Inc., 1982.
Product literature for Rader Chip Thickness Screening/Slicing System, Rader Companies Inc., 1979.
Product literature for Rader Chip Thickness Analyzer/Classifier, Rader Companies Inc., 1982.
Product literature for Rader Chip Preparation System, Rader Companies, Inc., date unknown.
Keating, James L., New-Concept "V" Screen Improves Chip Quality at Fiskeby AB Mill, Pulp and Paper, Jun. 1980.
Rader Companies, Inc., product literatue, technical drawing of Primary "V" Screen Model RVSP, Jun. 1981.
Rader Companies, Inc., product literature, technical drawing of Secondary Disc Screen Model RDSS, Jun. 1981.
Rader Companies, Inc., product literature, technical drawing of Fines "V" Screen Model RVSF, Dec. 1979.
Rader Companies, Inc., product literature, technical drawing of Stone Trap with Reject Conveyor Dimensions, Jan. 1980.
Rader Companies, Inc., product literature, technical drawing of Chip Slicer Dimensions, Dec. 1979.

Primary Examiner—Douglas D. Watts
Attorney, Agent, or Firm—Wolf, Greenfield & Sacks

[57] ABSTRACT

The invention comprises a method and apparatus for breaking apart tightly compressed and interlocked articles such as plastic bottles into separate individual articles in a form suitable for subsequent processing.

26 Claims, 3 Drawing Sheets 5,217,174

BALE BREAKER

FIELD OF THE INVENTION

This invention relates to a process for breaking apart and disintegrating bales of tightly compressed and interlocked articles. This process is one part of a complete process to recycle used plastic bottles and other articles. However, the invention can also be applied to opening bales of material other than plastics and, therefore, can be utilized in processes other than plastics recycling.

BACKGROUND OF THE INVENTION

Plastic materials that have been picked, sorted and collected for recycling are characterized as being of light weight and relatively bulky (low bulk density). In recycling operations, it is usually important to minimize storage space requirements for the articles to be recycled and to reduce transportation and handling costs. By definition, plastics are capable of being compressed or formed and are generally pliable. Such materials lend themselves to being compressed into compact, dense bales using commonly available baling machines. "Baleable" plastic materials such as plastic bottles or containers are fed into a baling machine and tightly compressed into a dense and compact cube shape, usually about 3'×4'×5'. After being so compressed and compacted, the bale is usually bound with steel wires or plastic straps to hold it together during subsequent handling and transportation.

Before the baled plastic material can be re-used as raw material for new plastic products, it must be processed into a form suitable for use with plastics handling and processing equipment. Such recycling processing equipment typically includes, at a minimum, equipment for granulating the recovered and used plastic materials into pieces of a shape and size suitable for subsequent processing. Most such granulating machines are limited in the size of the raw materials they can receive and process. Typical granulators available and used in such recycling operations cannot receive and process a baled plastic package as described above, but are designed to "grind" a steady stream of loose plastic bottles or other articles. However, as described above, the baling process compresses the bottles together and they become interconnected and interlocked such that when the ties around the bale are cut off and removed, the bale largely retains its shape. The individual plastic bottles do not fall apart from one another, but must be physically pried and struck with a tool to break them loose from the bale.

Accordingly, it is an object of the present invention to provide specially designed equipment and a related process for tearing apart the compressed and interlocked articles in a bale.

It is a further object of the present invention to provide a machine and related process for completely disintegrating bales of interlocked materials and releasing the individual articles quickly and with no need for manual labor.

SUMMARY OF THE INVENTION

The invention comprises a method and apparatus for breaking apart tightly compressed and interlocked baled plastic bottles or other articles into separate articles in a form suitable for subsequent processing. The apparatus comprises an inclined roller conveyor upon which bales of articles are placed. The bales are urged along the conveyor by gravity or motor means to a bale breaker which consists of a series of multiple toothed, rotating discs and a barrier for stopping the forward movement of the bales in a position in which they are engaged by the rotating discs. The rotating discs continuously strike at the bottom of the bale and dislodge the individual articles from the bale. The individual articles broken apart from the bail fall through appropriately sized gaps provided between the rotating discs or are hurled through appropriately sized gaps provided in the bale barrier, in either case landing on another conveyor which carries the individual articles towards further processing equipment. The spaces provided between the rotating discs and in the bale barrier are sized to prevent baled articles from passing through but are large enough to allow the individual articles or small groups of interlocked articles, depending on the article size capabilities of the succeeding equipment, to pass through. The above described process continues until the bale is completely disintegrated and all articles are small enough to pass through the gaps. Once the preceding bale or bales are removed, room is created so that the next bale can enter the bale breaker.

DETAILED DESCRIPTION OF THE PREFERRED EMBODIMENT

Figure 1:
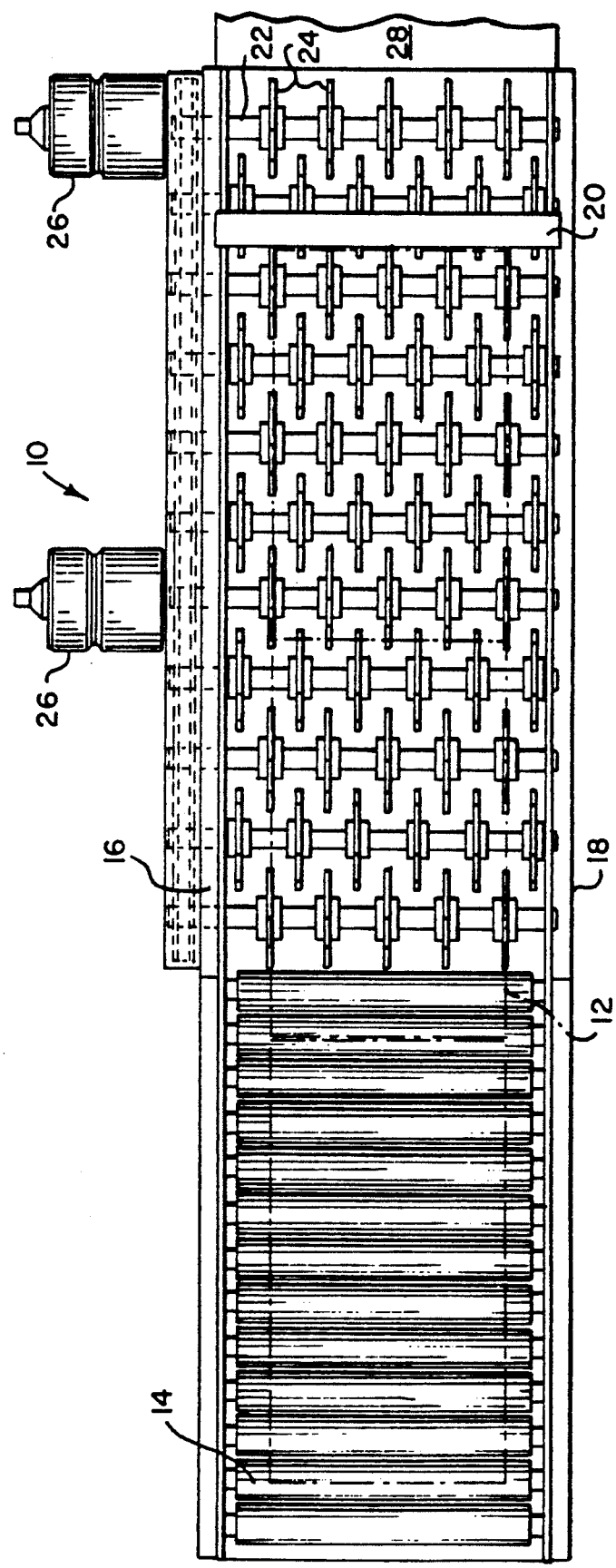
FIG. 1 is a plan view of the basic bale breaker of the present invention.

The invention will now be described in detail with respect to the preferred embodiment shown in FIGS. 1-3 in which it is adapted for releasing plastic bottles from compressed bales of plastic bottles. It should be understood that the invention can be used on other types of baled materials which tend to interlock and interconnect when compressed into a bale. For instance, the same bale opening process could be used for opening bales of aluminum cans, other types of baled plastic containers such as milk jugs, water jugs, polystyrene foam containers of various types, and other types of foam plastic sheets or packaging materials. In each case, the spacing between the discs and the openings in the bale barrier are sized in accordance the articles to be separated and passed through.

Bales 12 of the plastic material are off-loaded (usually by a forklift truck) onto an inclined infeed conveyor, preferably a non-powered roller conveyor 14, which allows the bales to roll down in alignment by gravity and automatically feed into the bale breaker 10 after the preceding bale or bales have been completely opened and passed through the bale breaker.

The bale breaker comprises a semi-enclosed area defined by walls 16 and 18, bale barrier 20 and the plane defined by discs 22. The bale breaker 10 may also comprise an overhead wall or ceiling (not shown). The side walls 16 and 18 and optional ceiling prevent the bale or the individual bottles from being thrown clear of the bale breaker 10 as they are dislodged from the bale as described below.

Figure 2:
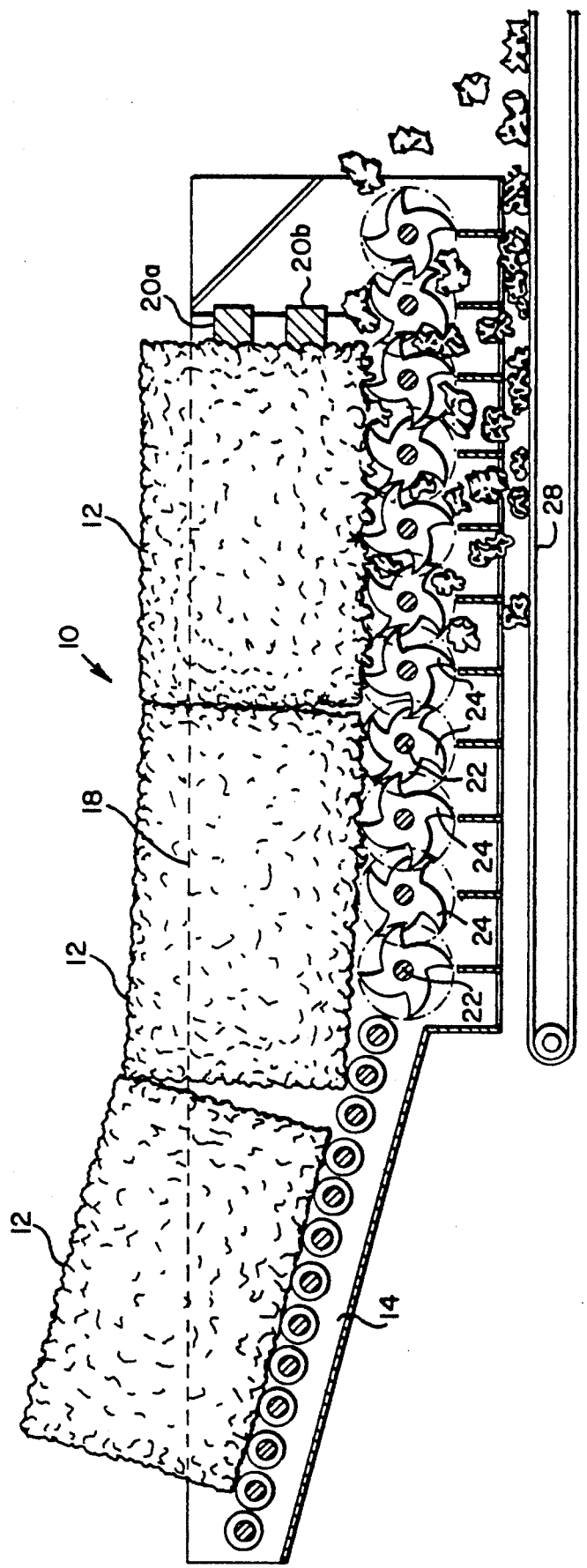
FIG. 2 is a cross-sectional side view of the basic bale breaker of the present invention.
Figure 3:
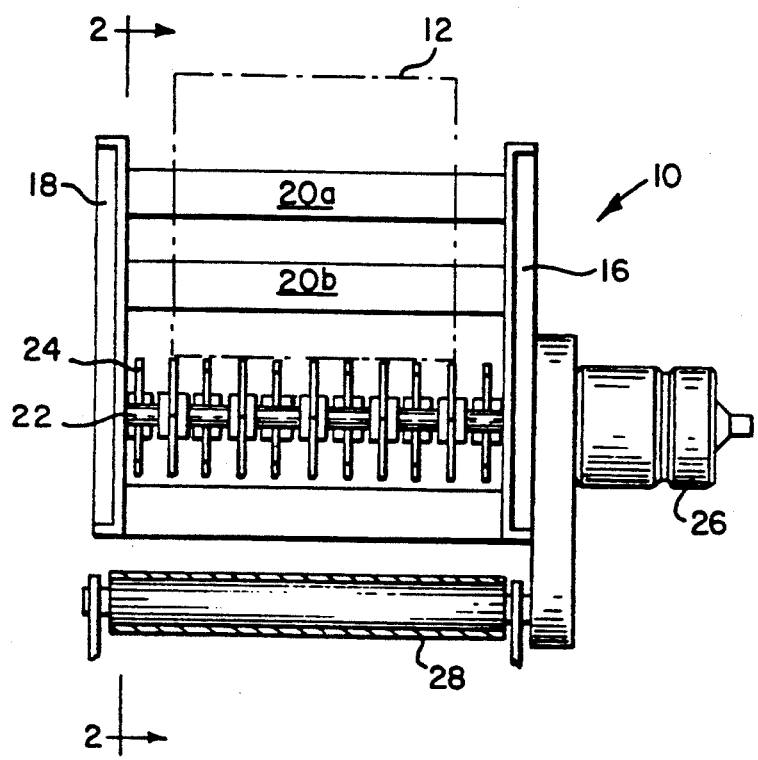
FIG. 3 is an end view of the basic bale breaker of the present invention.

In the preferred embodiment shown in FIGS. 1-3, the bale barrier comprises two bars 20a and 20b which extend horizontally from wall 16 to wall 18 and block the bales from moving to the right in FIG. 1. The bars are positioned relative to one another such that there is space between the bars large enough to allow individual articles to pass through a they are separated from the bale. In actuality, the spacing of the bars is dictated by the largest part size which the succeeding equipment in the recycling line is adapted to handle. Accordingly, bars 20a and 20b may be spaced to allow larger pieces to pass through, such as two or three bottles dislodged from the bale but still interlocked to each other. Vertical bars may be necessary as part of the bale barrier depending on the maximum piece size requirements of the succeeding equipment. Alternately, a screen may also be utilized as the bale barrier.

The bales are broken apart and disintegrated by a matrix of rotating, toothed discs 22 disposed in a horizontal plane which defines the "floor" of the bale breaker 10. Each disc has continuous deep teeth cut into its diameter. A plurality of rotating discs are connected to each shaft 24. Multiple parallel shafts are provided as shown in FIG. 2 and drive motors 26 are connected through chain drives to each shaft 24.

Additional rotating discs mounted on shafts disposed vertically along the side walls 16 and 18 or even along the optional ceiling may be provided to break apart the bales even faster. However, even if such additional rotating discs were provided, most of the work would be done by the "floor" rotating discs since the bales are forced against them by their own weight. Accordingly, the less complex embodiment shown in FIGS. 1-3, wherein only the "floor" discs are provided is the preferred embodiment.

In alternate embodiments, the rotating discs may be replaced by rotating arms or flails. The appropriate implement for striking the bales would be dictated by the baled articles.

The shafts 24 are spaced apart from one another and the discs 22 on each individual shaft 24 are spaced apart from one another at intervals dictated by the part size requirements of the succeeding processing equipment, as discussed above in regard to the bale barrier 20. The gaps between the rotating discs 22 and the shafts should be essentially the same size as the gaps in the bale barrier 20.

As the first bale 12 rolls down onto the bale breaker, the rotation of the discs 22 draws the bale 12 from left to right until it is stopped by the bale barrier 20.

With the bale horizontal movement stopped, the rotating multiple-toothed discs 22 strike continuously at the bottom of the bale 12. This action breaks the plastic bottles free from the bottom of the bale. The bottles then either fall through the openings between the discs 22 and between the shafts 24, or are hurled through the openings in the bale barrier 20.

The released plastic bottles or other articles drop onto a discharge conveyor 28 located under the bale breaker 10 and extending beyond the bale barrier 20 which carries the released material towards the succeeding equipment in the recycling process.

As the bale 12 lying against the bale barrier 20 is disintegrated and passed through, the next bale 12 automatically moves into the vacated position. As shown in FIGS. 1 and 2, the bale breaker may be large enough to accommodate multiple bales simultaneously.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An apparatus for separating individual articles from compressed bales of interlocked articles comprising;

means for feeding a plurality of bales comprising interlocking articles in one direction, means for stacking said bales in alignment, with a first bale in a first fixed position, means for agitating said first bale wherein said bale is disintegrated by separation of said individual articles without destruction of individual articles, and means for conveying said individual articles from said first position such that, as said first bale disintegrates, a second of said bales in said stack is moved into said first position.

2. An apparatus as set forth in claim 1 wherein said articles comprise plastic bottles.

3. An apparatus as set forth in claim 1 wherein said means for feeding comprises a non-powered roller conveyor.

4. An apparatus as set forth in claim 3 wherein said non-powered roller conveyor is inclined such that said bales are advanced in said one direction by force of gravity.

5. An apparatus as set forth in claim 1 wherein said means for stacking said bales in alignment with a first bale in a first fixed position comprises a bale barrier, said bale barrier comprising a plurality of bars positioned to prevent said bale from continued motion in said one direction.

6. An apparatus as set forth in claim 5 wherein said bale barrier further comprises gaps between said bars of a size smaller than said bale and larger than said individual articles, whereby said articles may pass through said gaps.

7. An apparatus as set forth in claim 1 wherein said means for agitating comprises a plurality of rotating disks having teeth extending therefrom.

8. An apparatus as set forth in claim 7 wherein said means for conveying said articles from said first position comprises a discharge conveyor belt.

9. A method of separating articles in previously formed compressed bales of interlocked articles comprising, assembling a series of bales in alignment, said bales comprising interlocked articles, applying a continual force against said aligned bales in one direction towards a stop, agitating at least a first bale in said alignment to separate the article without destroying the articles, removing said separated articles from said alignment as they are separated, and replacing said first bale with the next adjacent bale in the alignment as said first bale is disintegrated.

10. A method as set forth in claim 9 wherein said agitating step comprises the step of repeatedly striking at said bales.

11. A method as set forth in claim 9 wherein gravity is used as said force.

12. An apparatus for separating articles from a bale of interlocked articles and delivering said articles to further processing equipment comprising;
   a plurality of discs having teeth extending therefrom,
   means for rotating said discs,
   means for delivering said bale to a predetermined position in which said bale is struck by said teeth of said discs as said discs rotate, whereby said interlocked articles are separated from said bale without being destroyed,
   means for restraining said bale in said predetermined position,
   means for allowing articles dislodged from said bale to exit from said predetermined position,
   conveyor means for conveying said dislodged articles to subsequent processing equipment.

13. An apparatus as set forth in claim 12 wherein said items comprise individual ones of said articles.

14. An apparatus as set forth in claim 12 wherein said discs are disposed in a horizontal plane.

15. An apparatus as set forth in claim 14 wherein said predetermined position is above said discs whereby said bale is forced against said teeth of said discs by the weight of said bale.

16. An apparatus as set forth in claim 15 wherein said means for restraining comprises;
   first and second walls adjacent said rotating discs defining said predetermined position, and
   bale barrier means comprising, a plurality of bars extending from said first wall to said second wall, said bars spaced apart from each other to form gaps therebetween of a size smaller than said bale and larger than said items, whereby said items may pass through said gaps.

17. An apparatus as set forth in claim 16 wherein all of said discs have parallel axes of rotation and all of said discs rotate in a single direction, said axes and said direction of rotation selected such that the striking of the bale by said teeth urges said bale and said dislodged articles towards said bale barrier.

18. An apparatus as set forth in claim 17 wherein said discs are mounted on a plurality of parallel shafts, each of said shafts comprising a plurality of evenly spaced discs, wherein the spacing between said discs on each shaft and the spacing between said shafts are selected so as to form gaps therebetween of a size smaller than said bale and larger than said items, whereby said items may pass through said gaps.

19. An apparatus as set forth in claim 12 wherein said articles comprise plastic bottles.

20. An apparatus as set forth in claim 12 wherein said means for restraining comprises a bale barrier and said means for allowing items to exit comprises gaps between said discs and gaps in said bale barrier and further wherein said conveyor means is positioned to receive said separated articles which pass through said gaps between said discs and said gaps in said bale barrier.

21. An apparatus for separating items of a predetermined maximum size from a bale of interlocked articles and delivering said articles to subsequent processing equipment comprising;
   a plurality of discs disposed in a horizontal plane, wherein each of said discs is spaced apart from said discs adjacent thereto so as to define gaps between said discs that are no larger than said maximum size, each of said discs comprising deep cut teeth therein,
   motor means for rotating said discs,
   first conveyor means for conveying said bale to a predetermined position above said plurality of discs,
   bale barrier means for restraining said bale in said position above said discs and allowing items no larger than said maximum size to pass through,
   second conveyor means positioned to receive said items no larger than said maximum size which pass through said gaps between said discs and said gaps in said bale barrier means and convey said articles to said subsequent processing equipment.

22. An apparatus as set forth in claim 21 further comprising;
   first and second walls adjacent said discs wherein said first and second walls, said bale barrier means, and said discs define said predetermined position.

23. An apparatus as set forth in claim 22 wherein all of said discs have parallel axes of rotation and all of said discs rotate in the same direction, said axes and direction of rotation selected such that the striking of the bale by said teeth urges said bale and said articles towards said bale barrier.

24. An apparatus as set forth in claim 23 wherein said discs are mounted on a plurality of parallel shafts, each of said shafts comprising a plurality of evenly spaced discs.

25. An apparatus as set forth in claim 21 wherein said articles comprise plastic bottles.

26. An apparatus for separating plastic bottles from a bale of interlocked plastic bottles and delivering said plastic bottles to subsequent processing equipment comprising;
   a plurality of parallel shafts disposed in a horizontal plane wherein each of said said shafts comprises a plurality of discs having deep cut teeth therein and wherein each of said discs is spaced apart from said discs adjacent thereto so as to define gaps between said discs, which gaps are of a predetermined size which allows passage of said bottles therethrough but not larger articles,
   motor means and chain drive means for rotating all of said shafts in the same direction,
   first conveyor means for conveying said bale to a predetermined position above said plurality of discs,
   bale barrier means for restraining said bale in said predetermined position above said discs, said bale barrier means having gaps of said predetermined size therein,
   first and second walls adjacent said discs wherein said first and second walls, said barrier, and said discs define said predetermined position, and
   second conveyor means positioned to receive said bottles which pass through said gaps between said discs and said gaps in said bale barrier and convey said bottles to said subsequent processing equipment.

* * * * *